(12) United States Patent
Gugel et al.

(10) Patent No.: US 10,408,310 B2
(45) Date of Patent: Sep. 10, 2019

(54) GEARBOX CONTROL METHOD

(71) Applicant: Deere & Company, Moline, IL (US)

(72) Inventors: Rainer Gugel, Plankstadt (DE);
Norbert Fritz, Ilvesheim (DE);
Andrew K. Rekow, Cedar Falls, IA (US); Dennis L. Jeffries, Waterloo, IA (US); David Mueller, Stutensee (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/863,852

(22) Filed: Sep. 24, 2015

(65) Prior Publication Data
US 2016/0090091 A1  Mar. 31, 2016

(30) Foreign Application Priority Data

Sep. 25, 2014  (DE) .................. 10 2014 219 438
May 4, 2015    (DE) .................. 10 2015 208 160

(51) Int. Cl.
| | |
|---|---|
| *B60W 30/188* | (2012.01) |
| *A01B 61/00* | (2006.01) |
| *B60W 10/26* | (2006.01) |
| *F16H 61/66* | (2006.01) |
| *F16H 3/72* | (2006.01) |
| *B60W 10/105* | (2012.01) |

(Continued)

(52) U.S. Cl.
CPC ............ *F16H 3/728* (2013.01); *A01B 61/00* (2013.01); *B60K 6/365* (2013.01); *B60K 6/445* (2013.01); *B60L 1/006* (2013.01); *B60W 10/105* (2013.01); *B60W 10/26* (2013.01); *B60W 30/188* (2013.01); *F16H 61/04* (2013.01); *F16H 61/66* (2013.01); *F16H 61/686* (2013.01); *B60W 2510/305* (2013.01); *B60W 2530/16* (2013.01); *B60W 2710/08* (2013.01); *B60W 2710/1005* (2013.01); *F16H 2037/0886* (2013.01); *F16H 2061/6603* (2013.01); *F16H 2200/2007* (2013.01); *F16H 2200/2023* (2013.01); *F16H 2200/2051* (2013.01)

(58) Field of Classification Search
None
See application file for complete search history.

(56) References Cited

U.S. PATENT DOCUMENTS

| | | | |
|---|---|---|---|
| 2006/0111211 A1* | 5/2006 | Kefti-Cherif | B60K 6/365 475/5 |
| 2006/0111212 A9* | 5/2006 | Ai | B60K 6/365 475/5 |
| 2008/0103002 A1 | 5/2008 | Holmes | |

FOREIGN PATENT DOCUMENTS

| | | |
|---|---|---|
| DE | 19749074 | 5/1999 |
| DE | 102011087946 | 6/2013 |
| DE | 102012204477 | 9/2013 |

OTHER PUBLICATIONS

European Search Report issued in counterpart application No. 15185916.2 dated Mar. 15, 2016 (6 pages).

(Continued)

*Primary Examiner* — Mussa A Shaawat
*Assistant Examiner* — Kyung J Kim (57) ABSTRACT

A power-split gearbox device in an agricultural work vehicle. The gearbox device includes a compounded gearbox, an electrical variator for the continuous varying of a ratio of the compounded gearbox, and a gearbox with an adjustable ratio to connect a drive motor with a propulsion of the work vehicle.

6 Claims, 6 Drawing Sheets

(51) Int. Cl.
*F16H 61/04* (2006.01)
*F16H 61/686* (2006.01)
*B60K 6/365* (2007.10)
*B60K 6/445* (2007.10)
*B60L 1/00* (2006.01)
*F16H 37/08* (2006.01)

(56) References Cited

OTHER PUBLICATIONS

DE Search Report issued in counterpart application No. 102014219438.5 dated Jun. 3, 2015 (7 pages).

\* cited by examiner

GEARBOX CONTROL METHOD

RELATED APPLICATIONS

This application claims the benefit of German Application Ser. No. 102014219438.5, filed on Sep. 25, 2014, and German Application Ser. No. 102015208160.5, filed on May 4, 2015, the disclosures of which are hereby expressly incorporated by reference in their entirety.

FIELD OF THE DISCLOSURE

The present disclosure relates to a method for the control of a power-split gearbox in an agricultural work vehicle, and in particular to a method for controlling a gearbox device that includes a compounded gearbox, an electrical variator for the continuous varying of a ratio of the compounded gearbox, and a gearbox with an adjustable ratio.

BACKGROUND

Continuous power-split gearbox devices are often used in construction machines and agricultural work machines such as, for example, tractors. These gearbox devices can be found with special frequency in the premium segment, and they are made as hydraulic-mechanical, power-split gearboxes. The power flow is hereby divided into a mechanical path, regularly conducted over one or more planetary gear sets, and a hydrostatic path, in which the power is conducted via a hydrostatic variator, with which a continuous adjustment of the ratio can be performed. These gearbox devices can be commercially obtained, for example, from manufacturers such as John Deere or Fendt.

Continuous power-split gearbox devices are known in which the variable path is made as an electrical variator. With such electro-mechanical gearboxes, both mechanical and electrical power are utilized as the drive power.

Another development with construction machines and agricultural work vehicles is found in the building or use of a second onboard network, which is in addition to the existing onboard network of the machine and is operated at a higher nominal voltage. Electrical consumers that require a higher nominal voltage for their operation can be operated with these second onboard networks. These electrical consumers can be located both on the machine itself and also on accessory equipment. This additional second onboard network on the machine is provided by a suitable generator system. However, additional production costs may be incurred and the total efficiency may be reduced as a result of the additional components.

SUMMARY

The present disclosure provides a method with which a second onboard network on the vehicle can be supplied in an integrated manner.

In one embodiment of the present disclosure, a method is provided in which, upon detecting an external power demand of an electric consumer, a ratio range of the gearbox with an adjustable ratio is adjusted in such a way that the first electrical machine is operated with a generator and the second electrical machine is operated in such a way that an existing power shortfall or power surplus, relative to the external power demand, is compensated.

An external power demand is defined as a power demand that arises outside of the gearbox device. Thus, the external power demand, for example, can come from an electrical consumer located on the work vehicle or from an electrical consumer located on accessory equipment of the work vehicle.

A power shortfall or a power surplus is defined herein to be a difference between the electrical power produced by the two electrical machines or only one of the electrical machines and the level of the external power demand, in that a shortfall exists if the external power demand exceeds the electrical power produced and a surplus exists if the electrical power produced exceeds the external power demand.

In one aspect, the first electrical machine produces an electrical power at a certain level, but a higher external power demand exists. In order to compensate for this difference, at least in part, the second electrical machine is also operated with a generator. In another aspect, the electrical machine produces an electrical power at a certain level, but a lower external power demand exists. In order to compensate for this difference, which then represents a power surplus, the second electrical machine is operated with a motor in order to take up this power surplus.

In the present disclosure, a power flowing in a variator branch, contrary to the original direction, i.e., referred to as idle power, can be used to cover an external power demand. To this end, such a ratio range of the gearbox having an adjustable ratio can be purposely adjusted so that the compounded gearbox delivers power into the variator branch. This power, delivered into the variator branch, is not returned as idle power into the compounded gearbox since it is conducted away via the first electrical machine and via the control, as electrical power to cover the external power demand.

In another embodiment, the compounded gearbox is formed by a planetary gear with three drive interfaces. Depending on the direction of the power flow, the drive interfaces can act as an inlet or as an outlet of the planetary gear. The drive motor can be connected in a drive system with the first drive interface of the planetary gear, in order to provide the gearbox device with drive power. This can, in turn, be passed onto the propulsion via the gearbox with an adjustable ratio and connected with the second drive interface of the planetary gear. Furthermore, the first of the two electrical machines can be connected in a drive system with the third drive interface of the planetary gear in order to represent a variable ratio between the first drive interface and the second drive interface of the planetary gear. The second of the two electrical machines is connected in a drive system with the drive motor of the work vehicle, where it can be carried out with the interposition of a ratio in the form of a spur gear stage.

During the driving of the work machine by the drive motor, the first electrical machine can be driven in a generator operation and in a motor operation. The generator operation produces electrical power which, per definition, is provided with a negative sign, and the motor operation requires or consumes electrical power. The power demand of the motor operation or the power delivery in the generator operation of the first electrical machine is dependent on the required tensile force of the work vehicle and the speed needed from the first electrical machine in order to attain the transmission ratio of the planetary gear to be adjusted.

In the event of an external power demand, a ratio range of the gearbox can be selected so that the first electrical machine is driven in a generator operation. The electrical power delivered by the first electrical machine in a generator operation can be made available via the control of an external electrical consumer in order to cover an existing external power demand. As a whole, the total efficiency attained on the output shaft and the control of the gearbox device rises due to the gearbox control method described herein since the electrical power of the first machine must be produced for the fulfillment of tensile force requirements. The electrical power therefore is not supplied again into the planetary gear as an idle power via the variator branch, but rather is made available via the control to an external electrical consumer.

In another embodiment, a ratio of the gear is adjusted by taking into consideration a driving resistance, the external power demand, and a desired driving speed. This ensures that only a ratio range of the gearbox with an adjustable ratio is controlled or only a ratio range other than the available ratio range is controlled if the current prevailing driving resistance and driving speed allow it.

In a further embodiment, an energy storage unit connected with the control is provided to compensate for an existing power surplus or power shortfall relative to the external power demand. This ensures that in case of a power surplus, less power is again circulated as idle power. In case of a power shortfall, power can be supplied in a controlled manner from the energy storage unit.

A torque adjustment of the electrical machines is achieved via the control independent of the speed of the electrical machines to supply energy into each of the electrical machines or an energy storage unit and to drive, with a generator, each of the two electrical machines.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
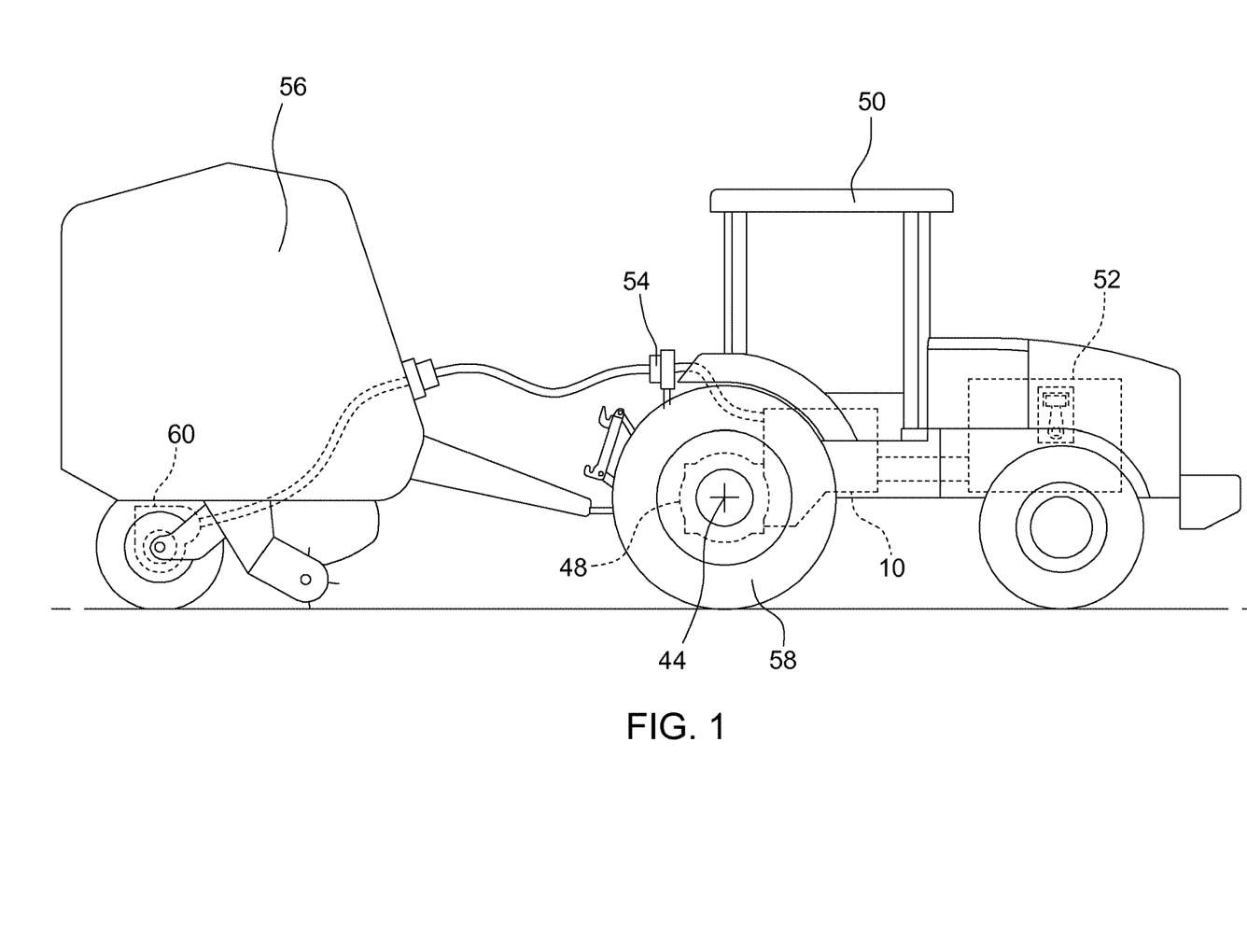
FIG. 1 is a side view of an agricultural work vehicle with accessory equipment.

FIG. 1 shows an embodiment of an agricultural work vehicle 50 with a power-split gearbox device 10. The gearbox device 10 is arranged for the purpose of making available an electrical power, via a control 26 and a power interface 54 in the form of an AEF connector, to an electrical consumer 60 in the form of an electrical drive axle on accessory equipment 56. Furthermore, an energy storage unit 27, connected with the control 26, can be provided to store and deliver electrical power. The energy storage unit 27 can, for example, be a battery device. This arrangement is only one possible example. Thus, the electrical consumer 60 need not be an electrical drive axle, nor need it be located on accessory equipment 56, but rather can likewise be located on the work vehicle 50. Also, instead of an AEF connector, another standardized or non-standardized interface can be used.

Figure 2:
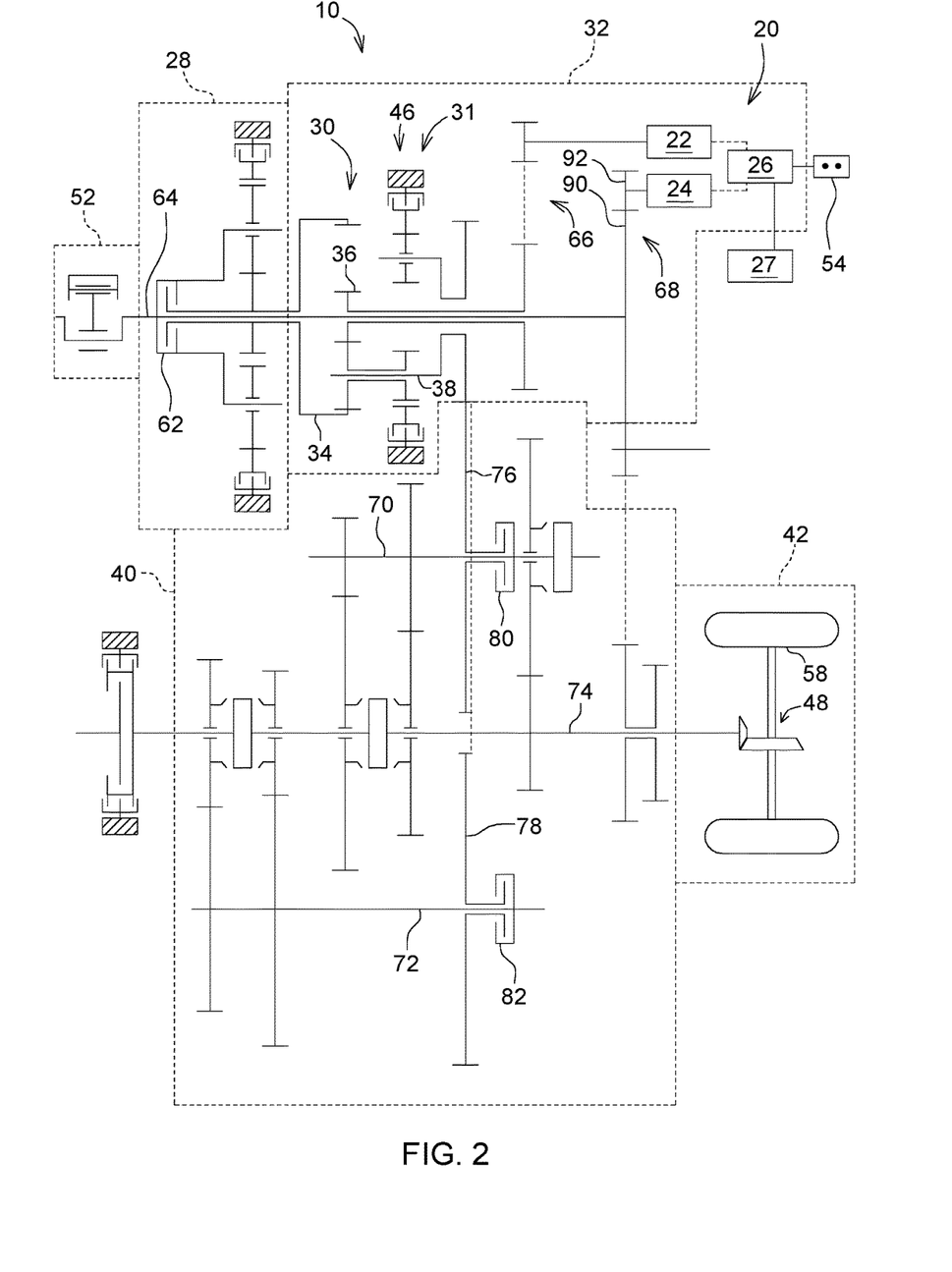
FIG. 2 is a gear scheme for executing the gearbox control method.

FIG. 2 shows a drive arrangement of the agricultural work vehicle 50, in which a drive motor 52 in the form of a combustion engine transfers its drive power via a reversible double planetary gear 28 and a gearbox device 10, which can be connected as needed to a propulsion 42. The propulsion 42 can include a differential gear 48 and a rear drive axle 44 with wheels 58. The gearbox device 10 includes a compounded gearbox 30 in the form of a planetary gear, an electrical variator 20 for the continuous adjustment of a transmission ratio of the planetary gear 30, and a gearbox 40 with an adjustable ratio in the form of a group gearbox with five available drives A, B, C, D, and E.

A building unit 32, consisting of the planetary gear 30 and the electrical variator 20, forms the power-split electromechanical gear unit of the gearbox device 10. A creeper gearbox 46, which can be connected as needed, can be directly subordinated to the planetary gearbox 30. The electrical variator 20 can include a first electrical machine 22, a second electrical machine 24, and a control 26 that is connected with the two electrical machines 22, 24 and the AEF connector 54. Other outputs (not shown) can be provided such as, for example, an output for a power take-off or an output for a front wheel drive, which can be connected as needed.

The drive of the planetary gear 30 takes place with the drive motor 52 via the hollow wheel 34 of the planetary gear 30, and the output in the direction of the gearbox 40 takes place via the planetary wheel support 38 of the planetary gear 30. To this end, via a switching element 62, the hollow wheel 34 can be drivably connected with the drive shaft 64 of the drive motor 52. The first electrical machine 22 is drivably connected with the sun wheel 36 of the planetary gear 30, via a first spur gear stage 66, in order to continuously vary the transmission ratio between the driven hollow wheel 34 and the driving planetary wheel support 38 of the planetary gear 30. The second electrical machine 24 is drivably connected, via a second spur gear stage 68, with the drive shaft 64 of the drive motor 52. The second spur gear stage 68 includes a drive gear 90 and a machine gear 92 that is in mesh therewith. The drive motor 52 drives the drive gear 90 via the drive shaft 64. The drive motor 52 and the drive gear 90 rotate together in unison. The drive gear 90 drives the machine gear 92. The machine gear 92 drives the second electrical machine 24 via a shaft. The machine gear 92 and the second electrical machine 24 rotate together in unison.

In one embodiment, the gearbox 40 is made as a double clutch gearbox with a first layshaft 70, a second layshaft 72, and a drive shaft 74. With the planetary wheel support 38 of the planetary gear 30, a first toothed wheel 76, disposed on the first layshaft 70, and a second toothed wheel 78, disposed on the second layshaft 72, are in tooth-meshing contact. The first toothed wheel 76 can be brought into a drive connection, via a switching element 80, with the first layshaft 70, and the second toothed wheel 78 can be brought into a drive connection, via a switching element 82, with the second layshaft 72. Proceeding from the layshafts 70, 72, a power flow to the drive shaft 74, which in turn drives the propulsion 42, can be switched via toothed wheel pairs and switch elements.

A torque adjustment of the two electrical machines 22, 24 can take place via the control independent of the speed of the two electrical machines 22, 24. Depending on the adjustable ratio of the planetary gear 30, the first electrical machine 22 can be operated in one rotation direction in a motor operation and in the opposing direction in a generator operation. If, for the planetary gear 30, a ratio for which a motor operation of the first electrical machine 22 is required is to be adjusted, then the second electrical machine 24 is operated in a generator operation and the electrical power thereby produced is made available to the first electrical machine 22 for its motor operation. This aspect of control can be further described below in reference to FIG. 3a.

Figure 3A:
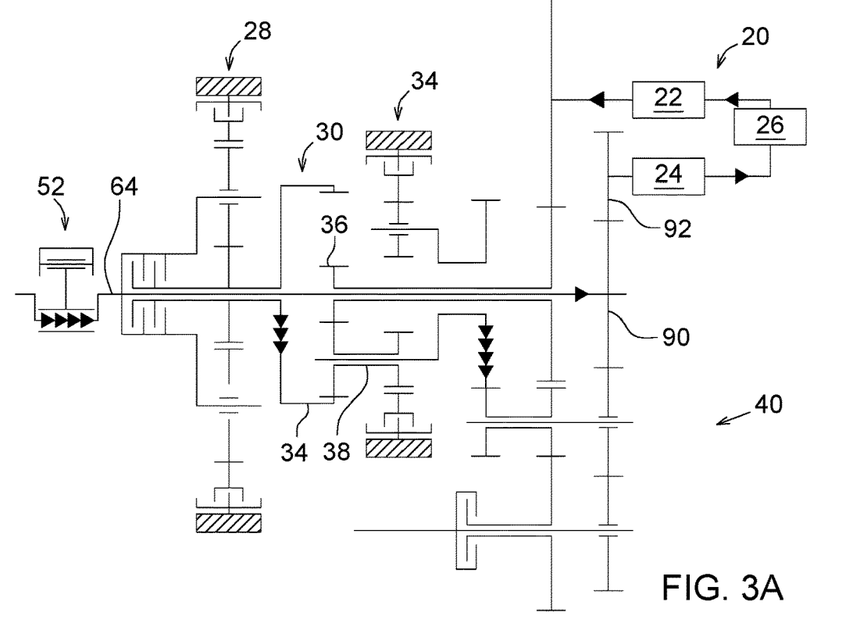
FIGS. 3a-3c are illustrative views of different power flows in a gear scheme.

In FIG. 3a, the flow from power units is shown with a power unit being symbolized by an arrow tip. In this example, the drive motor 52 can deliver four power units, of which three power units flow into the planetary gear 30 via the drive shaft 64 and the hollow wheel 34. Moreover, one power unit flows into the planetary gear 30 via the variator 20 and the sun wheel 36 so that, via the planetary wheel support 38, four power units flow off in the direction of the gearbox 40.

If a ratio is to be adjusted for the planetary gear 30 for which a generator operation of the first electrical machine 22 is required, then electrical power is produced that can be made available to another electrical consumer. Two conditions or scenarios can be distinguished from one another. In the first condition or scenario, there is no external power demand so the control unit 26 controls the second electrical machine 24 in the motor operation and the electrical power produced by the first electrical machine 22 is made available to it.

Figure 3B:
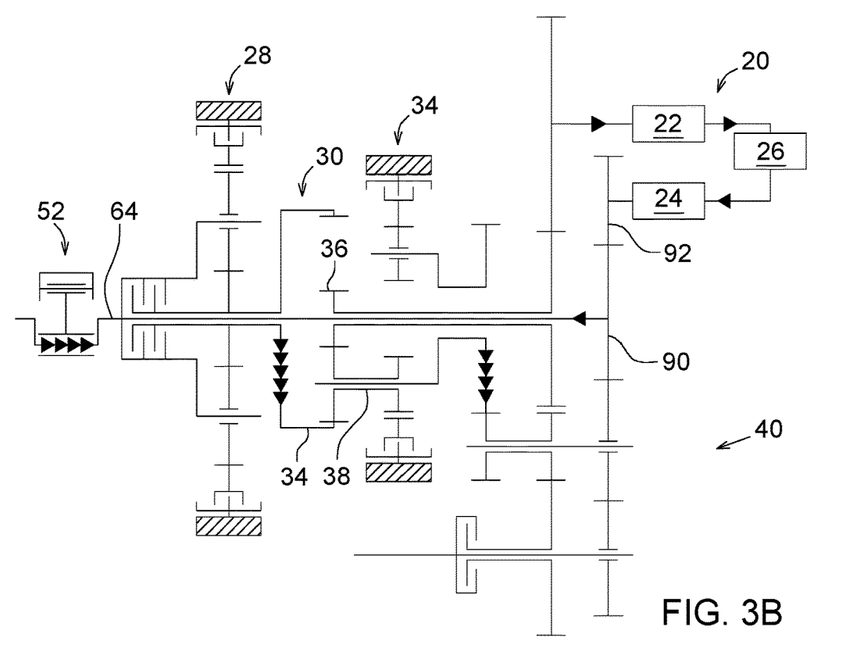

This first condition or scenario can be described by reference to FIG. 3b. Referring thereto, the drive motor 52 can deliver four power units. Since the electrical machine 22, however, is operated in a generator operation, a power unit for the drive flows via the sun wheel 36 into the first electrical machine 22. This power unit, which is not conducted to the outside, flows back to the drive shaft 64 via the second electrical machine 24, operated in a motor operation, so that together with the power units delivered by the drive motor 52, five power units flow into the planetary gear 30 via the hollow wheel 34. Since one power unit from this then flows off for the drive of the first electrical machine, four power units flow in the direction of the gearbox 40 via the planetary wheel support 38. This increase in power by one power unit within the planetary gear 30 is produced as a result of the idle power circulating backward via the variator 20.

Figure 3C:
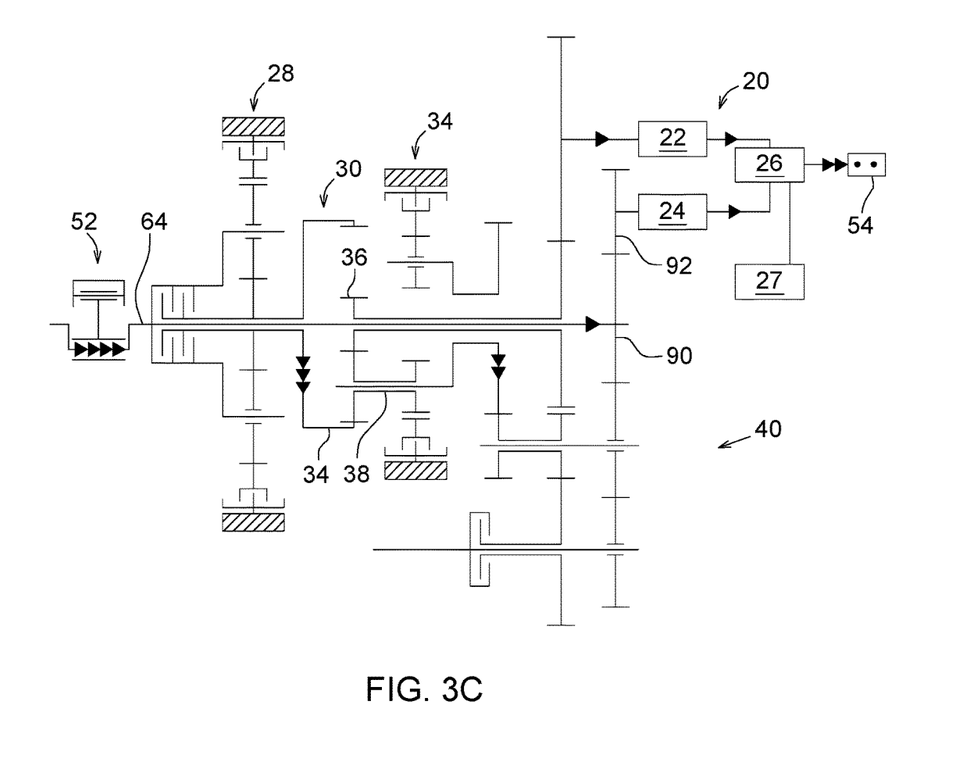

In the second condition or scenario, there is an external power demand so the electrical power produced by the first electrical machine 22 can be made available to an external consumer, for example, to the electrical drive axle of accessory equipment. This second condition or scenario can be further described with reference to FIG. 3c. In FIG. 3c, the power unit produced by the first electrical machine 22 is made available to an external electrical consumer via the control 26 and the AEF connector 54 to cover a corresponding external power demand. In addition, the second electrical machine 24 is controlled by the control 26 in a generator operation and the two power demands produced by the two electrical machines 22, 24 are made available to an external electrical consumer via the AEF connector 54. Correspondingly, only two power units flow in the direction of the propulsion 42. In one embodiment, which is not shown in FIG. 3c, the control unit 26 can control the second electrical machine in an idling state. Thus, with the four power units of the drive motor 52, only three power units flow in the direction of the propulsion 42, and one power unit via the AEF connector 54.

Figure 4:
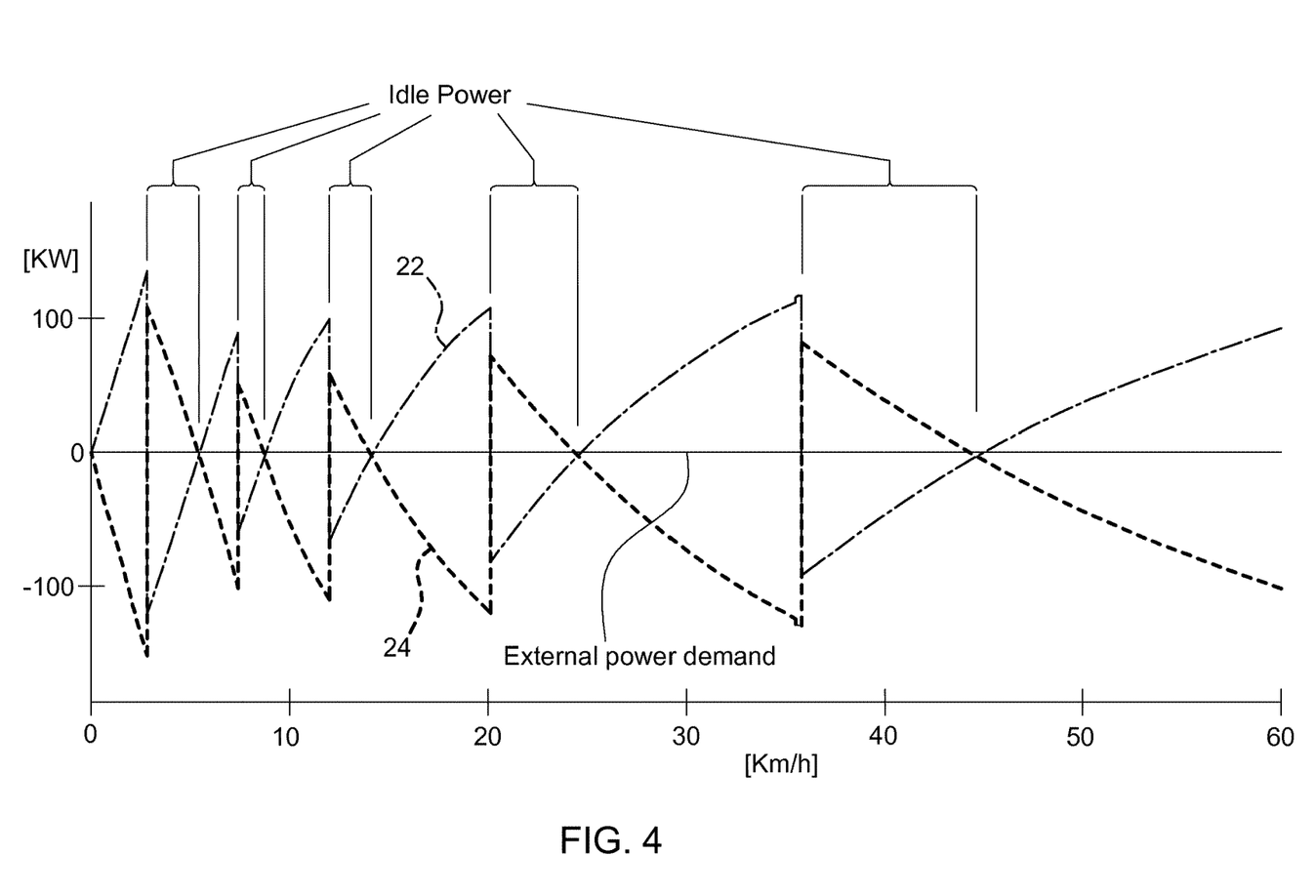
FIG. 4 is a graphical representation of electrical power courses via the vehicle speed without gearbox control.

FIG. 4 shows the electrical power outputs of the two electrical machines 22, 24 of the variator 20 relative to the driving speed of the work vehicle 50. One curve (illustrated as a dot-and-dash line) corresponds to the electrical power of the first electrical machine 22, and a second curve (illustrated as a dotted line) corresponds to the electrical power of the second electrical machine 24. The solid line along the zero axis corresponds to the electrical power that is delivered to an external consumer 60 and that, in this case, is zero, since an external power demand does not exist.

FIG. 4 shows the result of a calculation of the electrical power outputs that goes from a speed of the drive motor 52 of 1900 rpm and a complete power utilization of the drive motor 52. Different embodiments or examples of the power outputs are shown of the two electrical machines 22, 24. Beginning at a standstill, the work vehicle 50 accelerates with a switched power flow via the creeper gear 31 and in the first ratio range A of the gearbox 40. Initially, the first electrical machine 22 is operated in a motor operation, so that the electrical power taken up rises in the direction of a positive value, and the second electrical machine 24 is operated in a generator operation, so that the delivered electrical power rises in the direction of a negative value. In this switching range, an idle power does not circulate in the power-split gearbox unit 32.

If the two electrical machines 22, 24 reach their maximum power value according to the amount, the power flow is circumvented via the creeper gear 32 and the work vehicle 50 further accelerates in the first ratio range A of the gearbox 40. In this switching range, the first electrical machine 22 is initially operated in a generator operation, and the second electrical machine 24 in a motor operation so that idle power circulates in the gearbox unit 32. This idle power flow continues until a change of the modes of operation of the two electrical machines 22, 24 takes place, so that the first electrical machine 22 is operated in a motor operation and the second electrical machine 24 is operated in a generator operation and an idle power does not circulate. If the two electrical machines 22, 24 again reach their absolute maximum power value, a switching takes place into the second ratio range B of the gearbox 40, and the work vehicle 50 accelerates further.

Both for ranges A and B, as well as for the other ratio ranges C, D, and E of the gearbox 40, the embodiments illustrated in FIG. 4 correspond to the electrical power outputs of the two electrical machines 22, 24 as previously described for the ratio ranges A and B. Thus, after the switching into the ratio range, idle power circulates in the gearbox unit 32 until with a further acceleration. The first electrical machine 22 is operated in a motor operation, and the second electrical machine 24 is operated in a generator operation.

Figure 5:
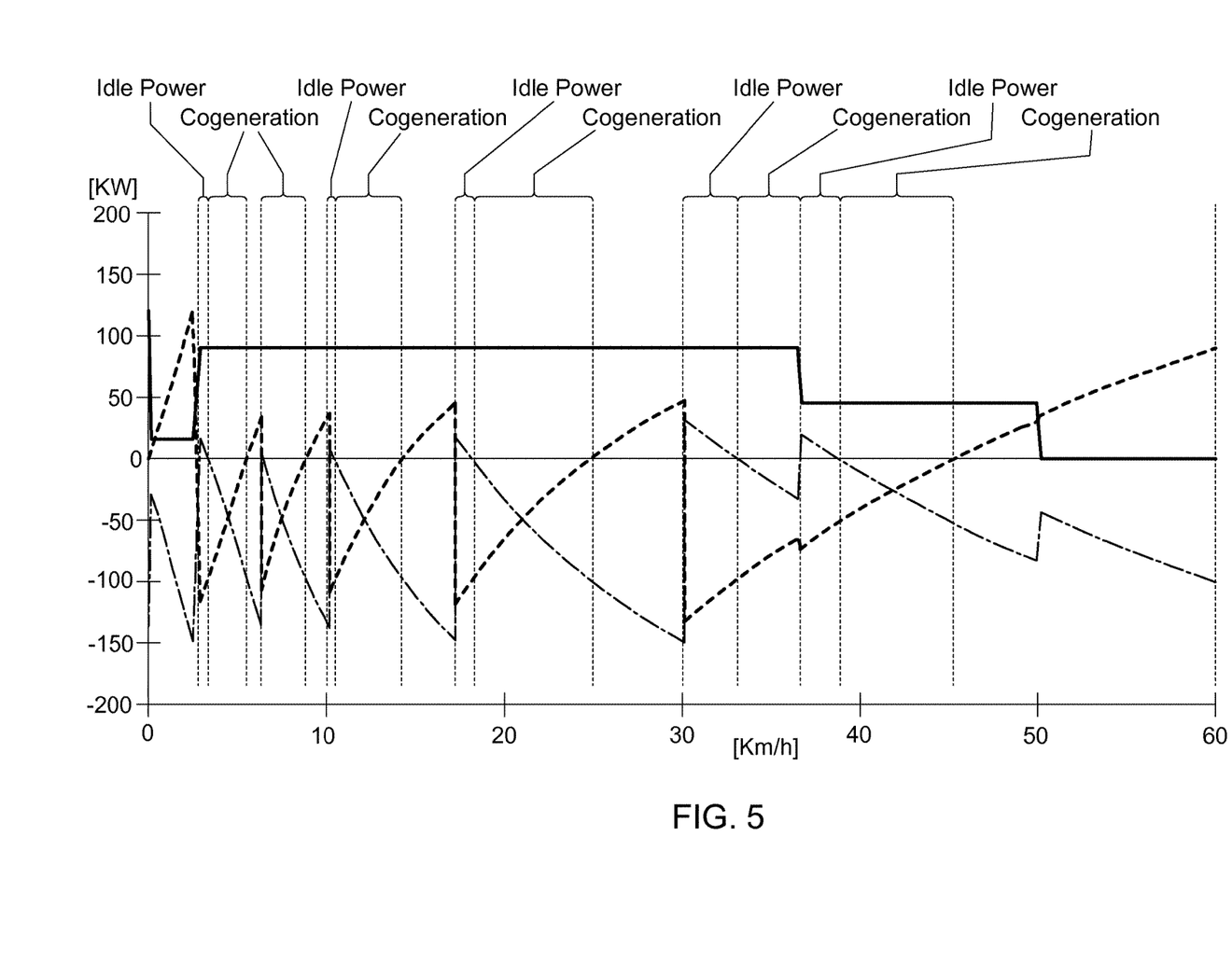
FIG. 5 is a graphical representation of electrical power courses via the vehicle speed with gearbox control.

FIG. 5 shows the result of a calculation of the electrical power outputs while using the gear control method in accordance with this disclosure. In this embodiment, the drive motor 52 is operated at a speed of 1900 rpm and a complete power utilization of the drive motor 52. Furthermore, a maximum power of 90 kW is delivered to the outside to cover an external power need. The order of magnitude of 90 kW power to be delivered to the outside is only an example in this embodiment and can vary in other embodiments.

Compared to FIG. 4, the illustrated embodiments or examples of the electrical power outputs of the two electrical machines 22, 24 in FIG. 5 are approximately the same. Thus, after a change of the ratio range of the gearbox 40, the two electrical machines 22, 24 change their modes of operation. In effect, however, as a result of switching times that are not short and cannot take place expeditiously and during the passage of the ratio ranges, the electrical power outputs of the two machines 22, 24 take place with opposing increases relative to one another and intersect within one ratio range. In contrast to FIG. 4, the embodiment of FIG. 5 shows that the switching points between the ratio ranges of the gearbox 40 are selected in such a way that, relative to the driving speed, they are carried out earlier and the ranges in which both electrical machines 22, 24 are operated in a generator operation are enlarged or broadened relative to driving speed ranges. Compared to FIG. 4, in which a power fraction circulates as idle power in the gearbox unit 32 in certain ranges, this power fraction is made available via the control 26 as an external power to an external consumer 60 in the gearbox control method that is the basis of FIG. 5, and at least predominantly, does not circulate in the gearbox unit 32.

In FIG. 5, relative to the driving speed, only relatively narrow ranges can be seen in which an idle power circulates in the gearbox unit 32. In these ranges, the power produced with a generator by the first electrical machine 22 exceeds the power of 90 kW delivered to the outside, so the second electrical machine 24 is operated with a motor in order to take up this excess power, which then circulates as idle power in the gearbox unit 32. In FIG. 5, the ranges are shown in which the first electrical machine 22 is operated with a motor and the second electrical machine 24 is operated with a generator. However, the electrical power produced by the second electrical machine 24 exceeds the power taken up by the first electrical machine 22, so the power exceeding the power need of the first electrical machine 22 can be made available as external power.

As a result, in a gearbox control of the gearbox device described herein, there is the possibility of operating both electrical machines in a generator operation, wherein the total efficiency of the gearbox device increases. Moreover, by means of the gearbox control method, there is the possibility of generating electrical power in a relevant order of magnitude with the existing gearbox device.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for controlling a power-split gearbox device in an agricultural work vehicle, comprising:
providing the power-split gearbox device with:
a compounded gearbox,
a gearbox with an adjustable ratio range in order to connect a combustion engine with a propulsion of the work vehicle, and
an electrical variator for continuously varying a ratio of the compounded gearbox, wherein the electrical variator includes a first electrical machine and a second electrical machine and a controller to control the electrical machines;
driving the second electrical machine with a machine gear that is fixed for rotation therewith, such that the second electrical machine and the machine gear rotate in unison at a same rotational speed;
driving the machine gear with a drive gear that meshes therewith, such that the machine gear contacts the drive gear;
driving the drive gear with the combustion engine that is fixed for rotation therewith, such that the drive gear and the combustion engine rotate in unison at a same rotational speed;
detecting an external power demand of an electrical consumer;
adjusting the ratio range of the gearbox after the detecting step; and
compensating for a power shortfall that is produced relative to the external power demand by operating the first electrical machine as a first generator and simultaneously operating the second electrical machine as a second generator.

2. The method of claim 1, further comprising adjusting the ratio range of the gearbox in view of a drive resistance, the external power demand, and a desired drive speed.

3. The method of claim 1, further comprising:
providing an energy storage unit coupled to the controller; and
using the energy storage unit to compensate for a power surplus or the power shortfall relative to the external power demand.

4. The method of claim 1, further comprising:
adjusting a torque of the electrical machines via the controller independent of a speed of the electrical machines; and
supplying energy into each of the electrical machines or an energy storage unit.

5. A method for controlling a power-split gearbox device in an agricultural work vehicle, comprising:
providing the power-split gearbox device with:
a compounded gearbox,
a gearbox with an adjustable ratio range in order to connect a combustion engine with a propulsion of the work vehicle, and
an electrical variator for continuously varying a ratio of the compounded gearbox, wherein the electrical variator includes a first electrical machine and a second electrical machine and a controller to control the electrical machines;
driving the second electrical machine with machine gear that is fixed for rotation therewith, such that the second electrical machine and the machine gear rotate in unison, at a same rotational speed, via a shaft;
driving the machine gear with a drive gear that meshes therewith, such that the machine gear contacts the drive gear;
driving the drive gear with the combustion engine that is fixed for rotation therewith, such that the drive gear and the combustion engine rotate in unison, at a same rotational speed, via a drive shaft;
detecting an external power demand of an electrical consumer;
adjusting the ratio range of the gearbox after the detecting step; and
compensating for a power shortfall or a power surplus that is produced relative to the external power demand.

6. The method of claim 5, further comprising compensating for the power shortfall that is produced relative to the external power demand by operating the first electrical machine as a first generator and simultaneously operating the second electrical machine as a second generator.

\* \* \* \* \*